United States Patent [19]

Uchino et al.

[11] Patent Number: 4,830,836
[45] Date of Patent: May 16, 1989

[54] METAL STRIPPING SYSTEM AND AN OPERATION PROCESS THEREFOR

[75] Inventors: Kazuhiro Uchino; Toshio Watanabe, both of Chiba; Yoshio Nakazato, Tokyo; Minoru Hoshino, Chiba; Akira Yamamoto, Chiba; Kanji I, Chiba, all of Japan

[73] Assignee: Kawasaki Steel Corporation, Kobe, Japan

[21] Appl. No.: 713,862

[22] Filed: Mar. 20, 1985

[30] Foreign Application Priority Data

Mar. 30, 1984 [JP] Japan ................... 59-62433
May 11, 1984 [JP] Japan ................... 59-94071
May 11, 1984 [JP] Japan ................... 59-94072

[51] Int. Cl.⁴ .................. B01D 9/02; B01D 11/04; C01G 49/10
[52] U.S. Cl. .................. 423/139; 75/101 BE; 75/108; 423/142; 423/143; 423/464; 423/DIG. 14
[58] Field of Search ............... 423/139, 142, 143, 464, 423/DIG. 14; 75/101 BE, 108

[56] References Cited

U.S. PATENT DOCUMENTS

| | | | |
|---|---|---|---|
| 3,615,246 | 10/1971 | Lindstrom | 422/252 |
| 4,390,508 | 6/1983 | Watanabe et al. | 423/112 |
| 4,397,682 | 8/1983 | Watanabe et al. | 75/15 A |
| 4,434,002 | 2/1984 | Watanabe et al. | 423/139 |
| 4,478,804 | 10/1984 | Watanabe et al. | 423/253 |
| 4,497,655 | 2/1985 | Watanabe et al. | 423/139 |
| 4,565,675 | 1/1986 | Uchino et al. | 423/140 |

FOREIGN PATENT DOCUMENTS

| | | |
|---|---|---|
| 0046973 | 3/1982 | European Pat. Off. |
| 0052354 | 5/1982 | European Pat. Off. |
| 79246 | 5/1983 | European Pat. Off. |
| 2153477 | 5/1973 | France |
| 2409780 | 6/1979 | France |

OTHER PUBLICATIONS

Chemical Abstracts, vol. 93-1980, p. 250, 93:136561m.

*Primary Examiner*—John Doll
*Assistant Examiner*—Jeffrey Edwin Russel
*Attorney, Agent, or Firm*—Balogh, Osann, Kramer, Dvorak, Genova & Traub

[57] ABSTRACT

A metal stripping system and an operation process therefor which includes the following elements and steps. A main part of this system is a crystallization apparatus for metal stripping comprising a mixing zone of organic solvent and fluoride series stripping solution, a settling zone for organic solvent, a settling zone for stripping solution, a separation zone for fluorinated metal complex crystal and a stripping solution cooling zone. In the operation of the system wherein the organic solvent containing extracted metal ions is contacted with the fluoride series stripping solution to deposit the fluorinated metal complex crystal and then the crystal is recovered as metal or metal oxide, the stripping solution is circularly used by supplying $NH_4HF_2$ solution to the cooling zone, supplying the stripping solution discharged from the apparatus and absorbed with a decomposition gas of the crystal to the mixing zone, and supplying a filtrate after the crystal separation to the settling zone for stripping solution.

2 Claims, 12 Drawing Sheets

FIG._1

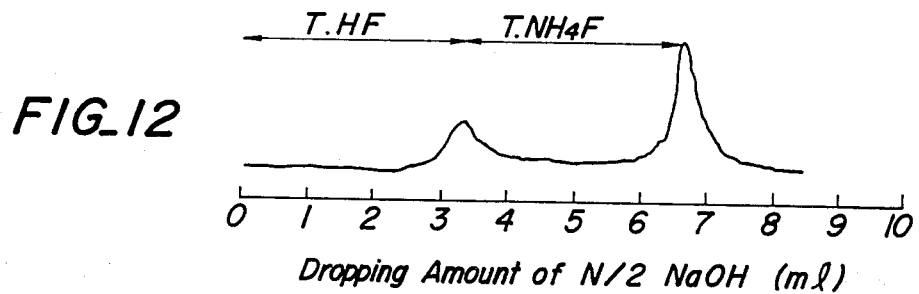
FIG_12
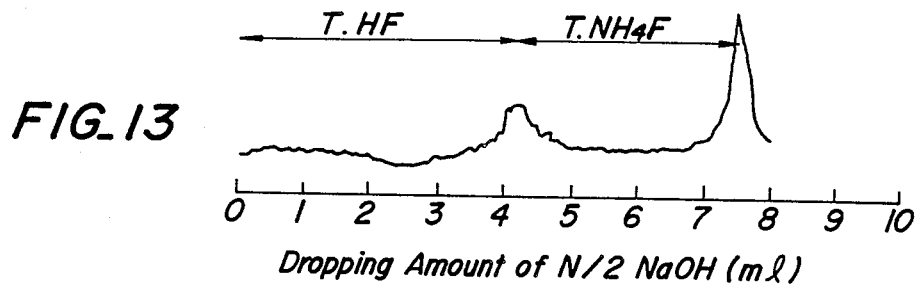
FIG_13
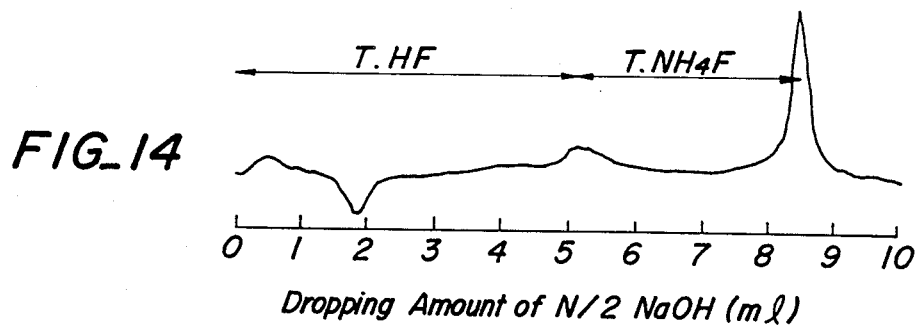
FIG_14

METAL STRIPPING SYSTEM AND AN OPERATION PROCESS THEREFOR

BACKGROUND OF THE INVENTION

1. Field of the Invention:

This invention relates to a system wherein an organic solvent containing extracted metal ions is mixed and contacted with a fluoride series stripping solution to deposit a fluorinated metal complex crystal and then the organic solvent, stripping solution and deposited crystal are individually recovered, and a process for operating such a system.

2. Description of the Prior Art:

Lately, solvent extraction is watched as a method for obtaining a high-purity metal or metal oxide, which is evaluated to be simple in the purification step and small in the energy consumption. And also, metals to be extracted include Mg, Ti, Cr, Mn, Fe, Co, Ni, Cu, Zn, Cd, Nb, Zr, Ta, Mo, W, In and the like.

In the solvent extraction method, the stripping (back-extraction) of the extracted metal ion has hitherto come into problem, which was solved by the use of a fluoride series stripping solution (an aqueous solution containing one or more of HF, $NH_4HF_2$, $NH_4F$; see Japanese Patent laid open No. 57-42,545, No. 57-73,138, No. 57-73,141 and No. 57-85,943). Further, there is proposed a crystallization apparatus of an inverted frusto-cone structure for use in the solvent extraction in Japanese Patent laid open No. 58-81,402. However, such a crystallization apparatus has been used only in a laboratory scale and has not yet been put to practical use in an industrial scale.

The inventors have made various studies in order to industrialize the crystallization apparatus disclosed in Japanese Patent laid open No. 58-81,402 and first developed an industrial scale apparatus having a crystal production capability of 45 tons/month and being able to conduct the continuous service for a long time or period, which was filed under the title of "Crystallization Apparatus for Metal Stripping" at the same time, or on the same date of the filing of this application.

In the operation of such an industrial scale apparatus, however, it is not clearly described to maintain the concentration and composition of the stripping solution circularly used at predetermined control ranges. And also, such an apparatus is not necessarily sufficient to perform the adjustment of the above concentration and composition. For instance, when the kind and position of chemicals fed to the circulating flow of the fluoride series stripping solution are inadequate, there are unfavorably caused troubles such as deposition of crystal inside the pipe or pump, clogging of the pipe or pump and the like. In the conventional metal separation system shown in FIG. 7, the above troubles are often produced during the operation as mentioned in the following comparative example, which is obliged to stop the operation of the system.

Further, the step of circulating the organic solvent in the solvent extraction method using the above apparatus consists mainly of extraction and stripping (back-extraction) stages. At these two stages, the working temperature is usually adjusted to be made relatively high or not to be excessively lowered in order to enhance the extraction and back-extraction efficiencies.

If the working temperature is too low, the viscosity of the organic solvent increases and the handling thereof is somewhat difficult, and also the extraction or back-extraction efficiency and rate lowers. Particularly, as the stripping temperature in the metal stripping step becomes higher, the back-extraction rate of metal ion is high and also the crystallization conditions for the resulting fluoride compound become advantageous.

On the other hand, if the working temperature for the organic solvent is too high, the deterioration of the organic solvent comes into problem. That is, the deterioration of the organic solvent results from a certain chemical change or the like and appears as a reduction of metal extraction rate or the like. Especially, when the organic solvent is continuously contacted with a strong acid or stripping solution, the deterioration is caused by hydrolysis or the like even at room temperature. And also, the degree of deterioration becomes conspicuous as the contacting temperature rises. In this connection, Japanese Patent laid open No. 55-18,512 merely discloses that the deterioration of organic solvent for the extraction of mineral acid (consisting of a neutral phosphate ester extractant and an aromatic hydrocarbon diluent) is suppressed by restricting the working temperature to not more than 30° C.

SUMMARY OF THE INVENTION

It is an object of the invention to provide a process for facilitating a long continuous service of a crystallization apparatus by giving favorable concentration and temperature conditions to each of organic and aqueous phases to stabilize the crystallization condition.

Particularly, the concentration control is required for preventing the deposition of crystal due to the cooling of the stripping solution which is apt to occur in the pipes, pump and the like other than a crystallization apparatus at a cold season, and also it is necessary to prevent the deterioration of the organic solvent due to the rising of temperature. Therefore, it is another object of the invention to provide optimum operating conditions.

It is a further object of the invention to provide effective measurement and adjustment on the concentration and composition of fluoride series stripping solution for controlling the concentration of the stripping solution in the metal back-extraction and further provide a favorable adjusting device for the concentration of stripping solution overcoming the drawbacks of the conventional device to smoothly perform the operation for the metal stripping step.

It is a still a further object of the invention to control the loss of expensive organic solvent due to the deterioration by giving a preferable temperature range to the organic solvent for metal extraction while attaining the original object on metal stripping.

According to a first aspect of the invention, there is the provision of a process for operating a system provided with a crystallization apparatus for metal stripping comprising a mixing zone, a settling zone for organic solvent, a settling zone for fluoride series stripping solution, a separation zone of fluorinated metal complex crystal and a stripping solution cooling zone, wherein an organic solvent containing extracted metal ions is contacted with a fluoride series stripping solution in the mixing zone to deposit a fluorinated metal complex crystal and then the resulting crystal is recovered as a metal or a metal oxide, characterized in that an aqueous solution of $NH_4HF_2$ is supplied to the stripping solution cooling zone in the apparatus, and the stripping solution discharged from an outlet for stripping solution is absorbed with a decomposition gas of the fluorinated metal complex crystal and supplied to the mixing zone, and a filtrate after the separation of the crystal is supplied to the settling zone for stripping solution located beneath the settling zone for organic solvent, whereby the fluoride series stripping solution is circularly used in the system.

According to a second aspect of the invention, there is the provision of a metal stripping system comprising a crystallization apparatus for metal stripping of an inverted frustocone type having a zone for mixing an organic solvent containing extracted metal ions with a fluoride series stripping solution, a settling zone for organic solvent, a settling zone for stripping solution, a zone for separating a fluorinated metal complex crystal and a stripping solution cooling zone; a tank for receiving the crystal slurry from the apparatus; a liquid-solid separation device for crystal; a drying device for crystal; a decomposition device for crystal; an absorbing device of decomposition gas; a device for supplying an aqueous solution of $NH_4HF_2$ to the apparatus; and a device for measuring each concentration of stripping solution, the decomposition gas absorbing device being connected to an outlet for stripping solution in the apparatus and an inlet for stripping solution in the mixing zone through pipes, an inlet from the $NH_4HF_2$ solution supply device being opened in the stripping solution cooling zone of the apparatus, and an inlet of a filtrate after the separation of the crystal being opened in the settling zone for the stripping solution of the apparatus.

According to the invention, a diluted solution of alkyl phosphoric acid or carboxylic acid extractant with n-paraffin can be used as the organic solvent extracting metal ions, while an aqueous solution containing one or more of $NH_4HF_2$, $HF$ and $NH_4F$ can be used as the fluoride series stripping solution. Particularly, according to the invention, the $NH_4HF_2$ solution and fluorine series decomposition product and, if necessary, ammonia are supplied to the crystallization apparatus at proper positions, respectively, by controlling the concentration of the fluoride series stripping solution in two items of total HF and total $NH_4F$.

In a preferred embodiment of the invention, the concentration of the stripping solution supplied to the crystallization apparatus is adjusted in such a manner that the concentration of the stripping solution discharged from the apparatus is 85-115 g/l as $NH_4HF_2$, while the temperature of the organic solvent supplied to the apparatus is kept at 20°-25° C., and the liquid temperature in the mixing of the organic solvent and the stripping solution is kept below 40° C., and the temperature of the stripping solution in the cooling zone is kept at 15°-20° C. Particularly, the temperature of the organic solvent is adjusted to be 25°-40° C. at the inside of the crystallization apparatus and 10°-30° C. at the insides of the devices other than the above apparatus as well as the pipes and tanks.

BRIEF DESCRIPTION OF THE DRAWINGS

The invention will now be described with reference to the accompanying drawings, wherein:

FIGS. 12 to 14 are neutralization titration curves (differential type) of the fluoride series stripping solution by means of a potentiometric titration device, respectively, which show measurement results of the stripping solution containing 100 g/l of $NH_4HF_2$ and a varied amount (0, 10 and 20 g/l) of HF.

DETAILED DESCRIPTION OF THE INVENTION

The invention will be described in detail with reference to the drawings taking a case of $Fe^{3+}$ extraction, but it is not intended as limitations of the metal ion and systems shown in the illustrated embodiments.

Figure 1:
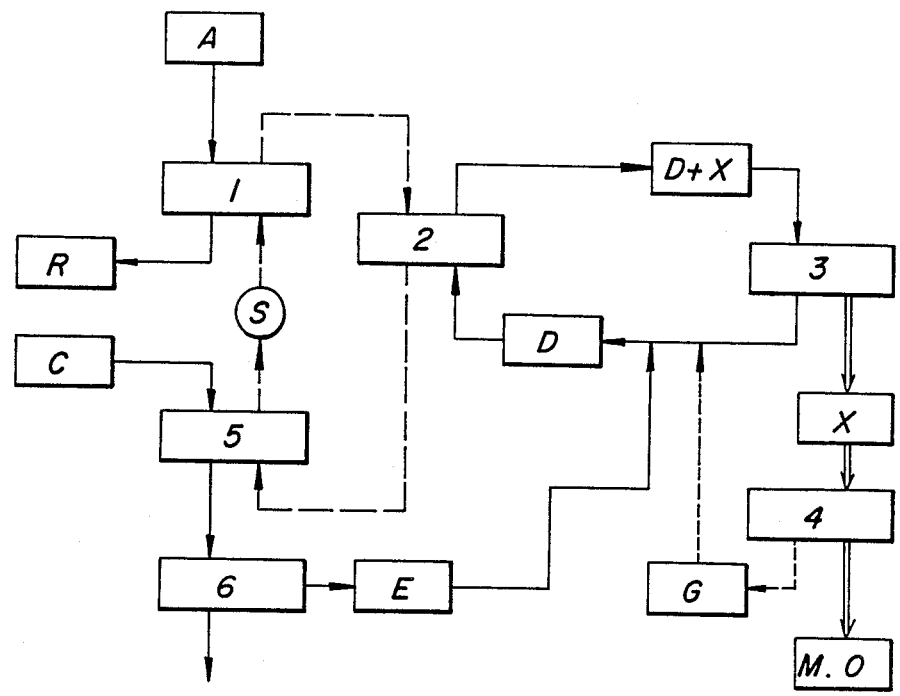
FIG. 1 is a flow diagram for the metal stripping system according to the invention inclusive of a fluoride series stripping solution circulating step by solvent extraction method.

FIG. 1 is a flow diagram of the metal stripping system including the circulation steps of organic solvent and fluoride series stripping solution according to the invention. As shown in FIG. 1, an aqueous solution A containing metal ions is first mixed and contacted with an organic solvent S at a metal extraction step 1, whereby the metal ions are extracted from the aqueous solution A into the organic solvent S. The aqueous solution left from the step 1 is a raffinate R, which is a recovered acid if A is a metal containing waste acid. When the metal ion in the aqueous solution A is $Fe^{3+}$ and the organic solvent S contains an ion exchange type extractant such as alkyl phosphoric acid or the like (which is abbreviated as HR hereinafter), the metal extraction is expressed by the following reaction formulae:

$$Fe^{3+} + 3HR \rightarrow FeR_3 + 3H^+ \quad (1)$$

$$FeF_2^+ + 3HR \rightarrow FeR_3 + H^+ + 2HF \quad (2)$$

$$FeF_2^+ + HR \rightarrow FeF_2R + H^+ \quad (3)$$

The reaction formulae (2) and (3) are the case of using an iron-containing nitric-hydrofluoric acid waste liquid as the aqueous solution A, wherein $Fe^{3+}$ in the solution A mainly takes an ionic form of $FeF_2^+$.

The organic solvent S containing the extracted metal ion is charged from the step 1 to a metal stripping (back-extraction) step 2, at where the organic solvent S is mixed and contacted with a warmed fluoride series stripping solution D to convert the metal ion into a fluorinated metal complex crystal X. When the metal ion is $Fe^{3+}$ and the stripping solution D is an aqueous solution consisting mainly of $NH_4HF_2$, the stripping (back-extraction) is expressed by the following reaction formulae:

$$FeR_3 + 3NH_4HF_2 \rightarrow 3HR + (NH_4)_3FeF_6 \downarrow \quad (4)$$

$$FeF_2R + 3NH_4HF_2 \rightarrow HR + (NH_4)_3FeF_6 \downarrow + 2HF \quad (5)$$

$$FeR_3 + 3NH_4HF_2 + 3NH_4F \rightarrow 3NH_4R + (NH_4)_3FeF_6 \downarrow + 3HF \quad (6)$$

After the stripping of iron, a part of the extractant is in an ammonia form ($NH_4R$) as shown in the reaction formula (6).

The stripping solution D containing the crystal X is left from the step 2 and fed to a liquid-solid separation step 3, at where the crystal X is separated from the stripping solution. After the separation of the crystal, the stripping solution is again circulated into the stripping step 2 for reuse.

The separated crystal X is fired at a drying-decomposition step 4 to produce a metal M or a metal oxide O. The metallic iron or iron oxide is produced from the fluorinated iron complex crystal $(NH_4)_3FeF_6$ by the following reaction formulae:

$$(NH_4)_3FeF_6 + 3/2 H_2 \rightarrow 3NH_4F + 3HF + Fe \quad (7)$$

$$(NH_4)_3FeF_6 + \tfrac{3}{2}_2 \rightarrow 3NH_4F + 3/2F_2 + \tfrac{1}{2}Fe_2O_3 \quad (8)$$

A fluorine series decomposition gas G comprising $NH_4F$, $HF$, $F_2$ and the like, which is generated from the step 4, is returned into the stripping solution D for reuse.

The organic solvent S containing the extractant of ammonia form is introduced from the step 2 into a solvent conversion step 5, at where it is contacted with an aqueous hydrochloric acid solution C to convert the ammonia form into a hydrogen form (HR) by the following reaction formula (9), which is returned into the step 1 for reuse:

$$NH_4R + HCl \rightarrow HR + NH_4Cl \quad (9)$$

The aqueous hydrochloric acid solution C containing $NH_4Cl$ is fed from the step 5 to an ammonia recovering step 6, at where it is subjected to neutralization and distillation to recover an ammonia water E according to the following reaction formula:

$$NH_4Cl + NaOH \rightarrow NH_4OH + NaCl \quad (10)$$

The ammonia water E (ammonia liquor) recovered is returned into the stripping solution D for reuse, if necessary.

In connection with the concentration and composition of the fluoride series stripping solution D, the characteristic curve in the solubility of the fluorinated metal complex will be described taking the case of $(NH_4)_3FeF_6$ when the metal is $Fe^{3+}$.

Figure 2:
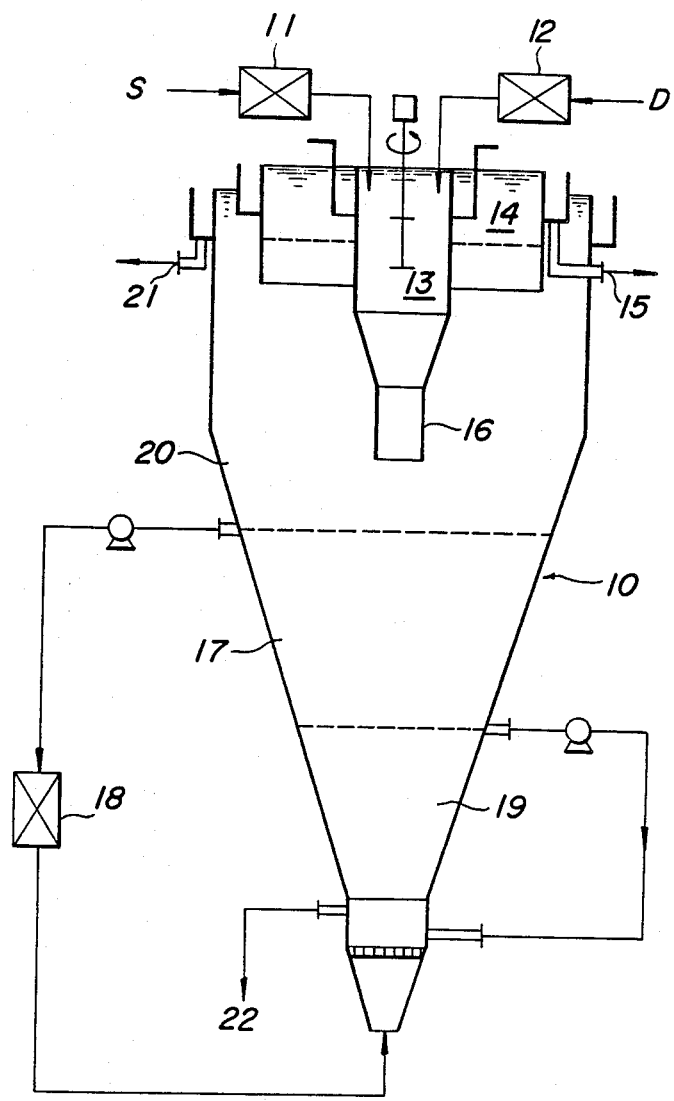
FIG. 2 is a schematically sectional view of an embodiment of the crystallization apparatus for iron stripping.
Figure 3:
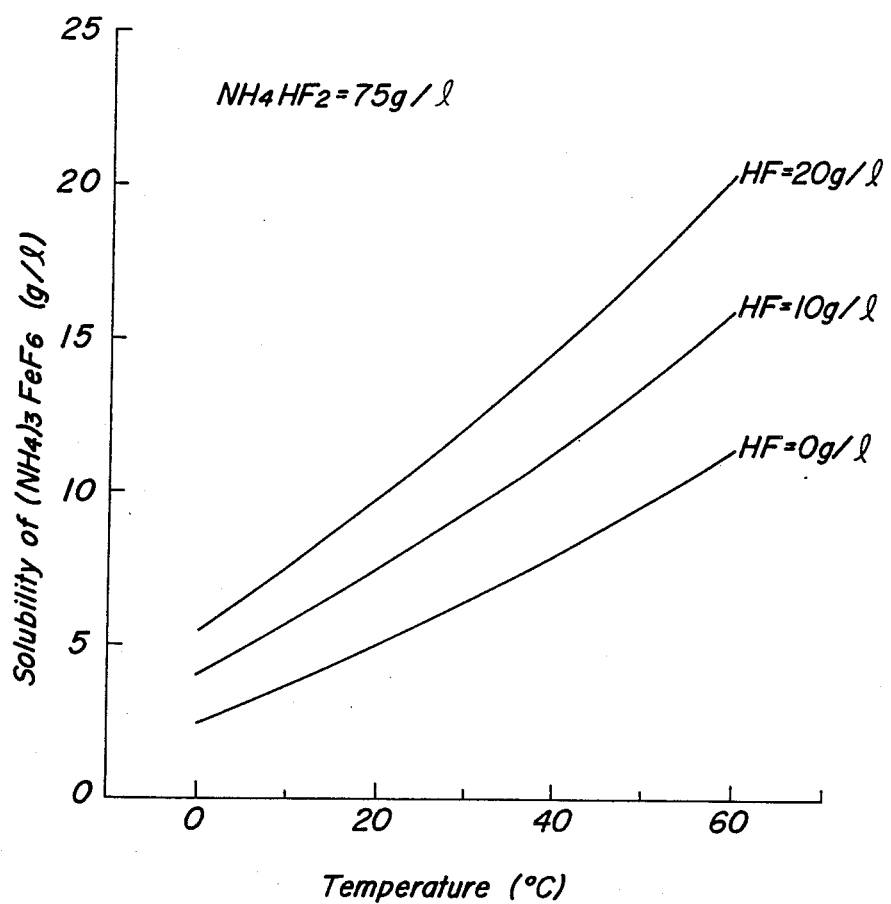
FIGS. 3 to 6 are graphs showing solubility curves of $(NH_4)_3FeF_6$ to the fluoride series stripping solution containing 75-150 g/l of $NH_4HF_2$ and 0-20 g/l of HF, respectively.
Figure 4:
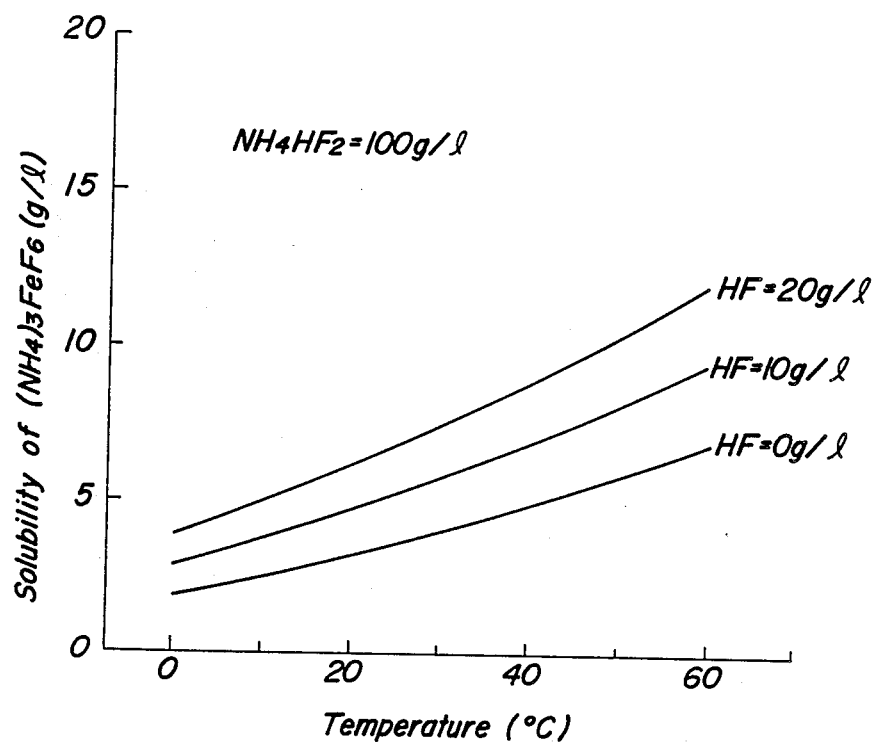
Figure 5:
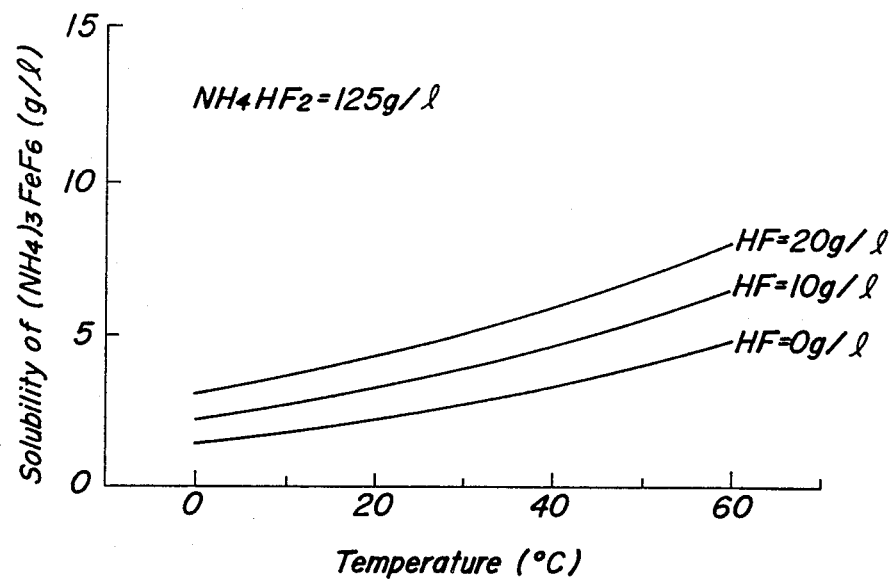
Figure 6:
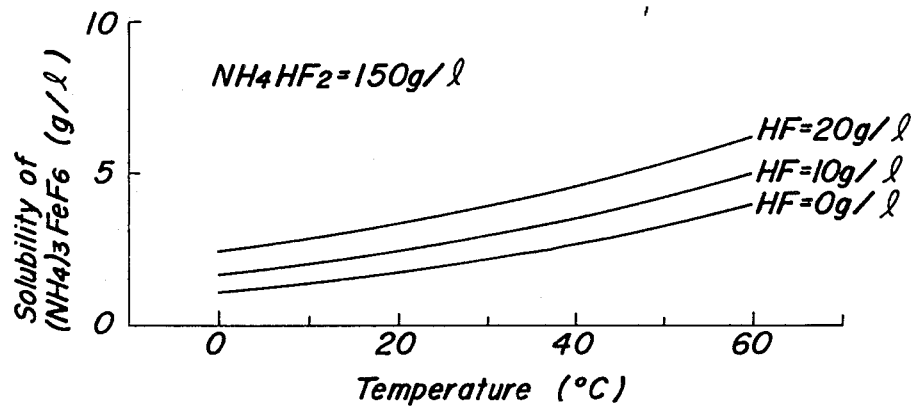

FIG. 2 shows an embodiment of the crystallization apparatus 10 used in the iron stripping step 2. The organic solvent S containing extracted $Fe^{3+}$ is introduced into a mixing chamber 13 through a temperature regulator 11, while the fluoride series stripping solution D containing $NH_4HF_2$ or the like is introduced into the mixing chamber 13 through a heating device 12. In the mixing chamber 13, an iron-fluorine complex $(NH_4)_3FeF_6$ is produced by iron stripping reaction as shown in the formulae (4), (5) and (6). After the iron stripping, the organic solvent is discharged from an outlet 15 through a settling zone 14.

Since the iron-fluorine complex is relatively small in the solubility against the stripping solution, it deposits as a crystal during the continuation of the stripping. The stripping solution containing the resulting crystal descends downward through a downpipe 16 and arrives at a stripping solution cooling zone (or a crystal growth zone) 17. This zone 17 is connected to a heat exchanger 18 and the like through pipes, whereby the warmed stripping solution is cooled to promote the growth of the crystal. If necessary, a forced circulation zone 19 is formed in the inside of the zone 17 and connected to an external circulating pump so as to give fluidity to the stripping solution, whereby the adhesion of crystal to the inner wall of the apparatus and the accumulation and agglomeration of crystal onto the bottom of the zone 17 can be prevented. The stripping solution is finally discharged from an outlet 21 through a crystal separation zone 20. On the other hand, the deposited crystal is properly discharged from an outlet 22 as a slurry, which is then subjected to liquid-solid separation.

The solubility curve of $(NH_4)_3FeF_6$ in the fluoride series stripping solution when operating the apparatus of FIG. 2 is shown in FIGS. 3 to 6, wherein the concentrations of $NH_4HF_2$ and $HF$ in the stripping solution are varied within ranges of 75-150 g/l and 0-20 g/l, respectively.

When $Fe^{3+}$ is stripped at the stripping step 2 according to the formula (4), $NH_4HF_2$ in the stripping solution D is consumed to decrease the $NH_4HF_2$ concentration. On the other hand, when the aqueous solution A containing the metal ion is an iron containing nitric-hydrofluoric acid waste liquid and $Fe^{3+}$ is stripped according to the formula (5), not only the $NH_4HF_2$ concentration of the stripping solution D decreases, but also the HF concentration increases because $F^-$ transported from the organic solvent to the stripping solution forms HF. In any case, as apparent from the solubility curves, the solubility of $(NH_4)_3FeF_6$ increases with the decrease of $NH_4HF_2$ concentration in the stripping solution D. Particularly, this tendency becomes conspicuous as the HF concentration increases.

Thus, the $NH_4HF_2$ concentration decreases with the progress of the metal stripping reaction, and when the metal ion is extracted as a fluoride ion, the HF concentration increases. Therefore, in order to circularly reuse the stripping solution, it is necessary to adjust the concentration and composition of the stripping solution to certain controlling ranges.

Especially, if the cooling of the stripping solution is caused outside the crystallization apparatus, it is apt to produce unfavorable phenomenon for the operation of the apparatus such as deposition of $(NH_4)_3FeF_6$. Further, the stripping solution is cooled by atmospheric temperature at a cold season such as winter or the like or is at a cooled state inside the pipe connected to the cooling zone even at a summer season. Therefore, the composition and concentration of the stripping solution are required to be adjusted within certain condition ranges.

The chemicals and the like to be supplied for adjusting the concentration and composition of the circularly reused fluoride series stripping solution D are as follows. In order to increase the $NH_4HF_2$ concentration, there are two methods, one of which being the addition of an aqueous solution of $NH_4HF_2$ (the concentration is usually 30-40%) J and the other of which being the absorption of fluorine series decomposition gas G produced according to the formulae (7) and (8) by the stripping solution in a suitable manner. Since the composition of the decomposition gas G produced according to the formulae (7) and (8) corresponds to the composition of $NH_4HF_2$, i.e. $NH_4F+HF$, the absorption of the decomposition gas G has substantially the same effect as in the addition of the aqueous $NH_4HF_2$ solution J. Further, in order to decrease the HF concentration, it is sufficient to add ammonia water or $NH_3$ gas E to neutralize HF. Particularly, the addition of ammonia E also contributes to the increase of $NH_4HF_2$ concentration as shown by the following equation:

(11)

As mentioned above, the addition of the aqueous $NH_4HF_2$ solution J or the absorption of the fluorine series decomposition gas G increase the $NH_4HF_2$ concentration in the stripping solution D, while the addition of ammonia water or $NH_3$ gas E decreases the HF concentration and increases the $NH_4HF_2$ concentration in the stripping solution D. In any case, the supply of these chemicals acts to reduce the solubility of the fluorinated metal complex in the stripping solution.

Therefore, when the chemicals and the like for the concentration adjustment are supplied to the stripping solution D having an increased solubility of fluorinated metal complex with the progress of metal stripping reaction, the solubility of the fluorinated metal complex rapidly reduces to deposit the fluorinated metal complex crystal X at once. As a result, when the position of supplying the chemicals is inadequate, the undesirable deposition of the crystal is caused to produce the aforementioned troubles such as clogging of pipe and the like.

Figure 7:
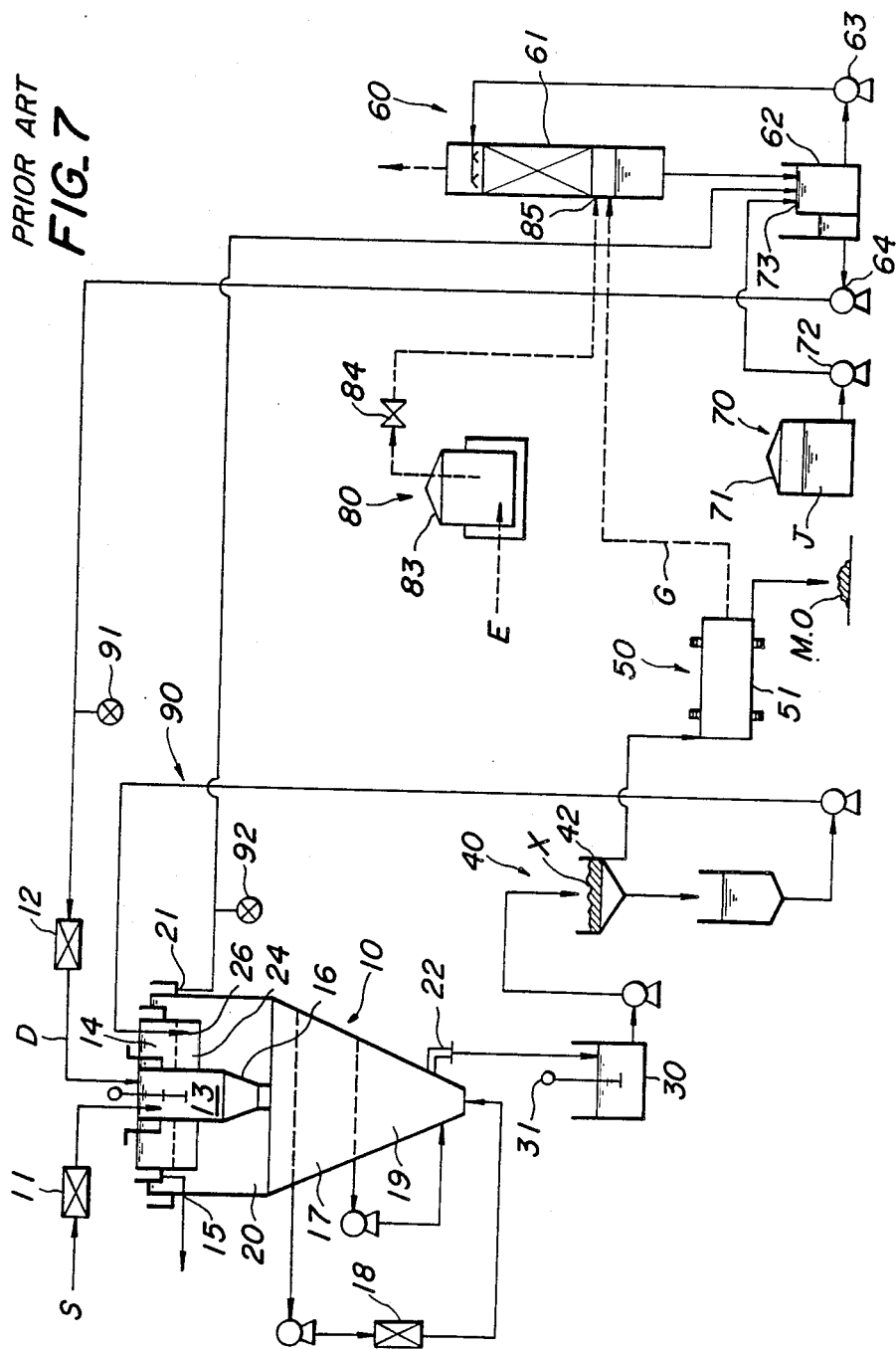
FIG. 7 is a schematic view of the conventional metal stripping system.
Figure 8:
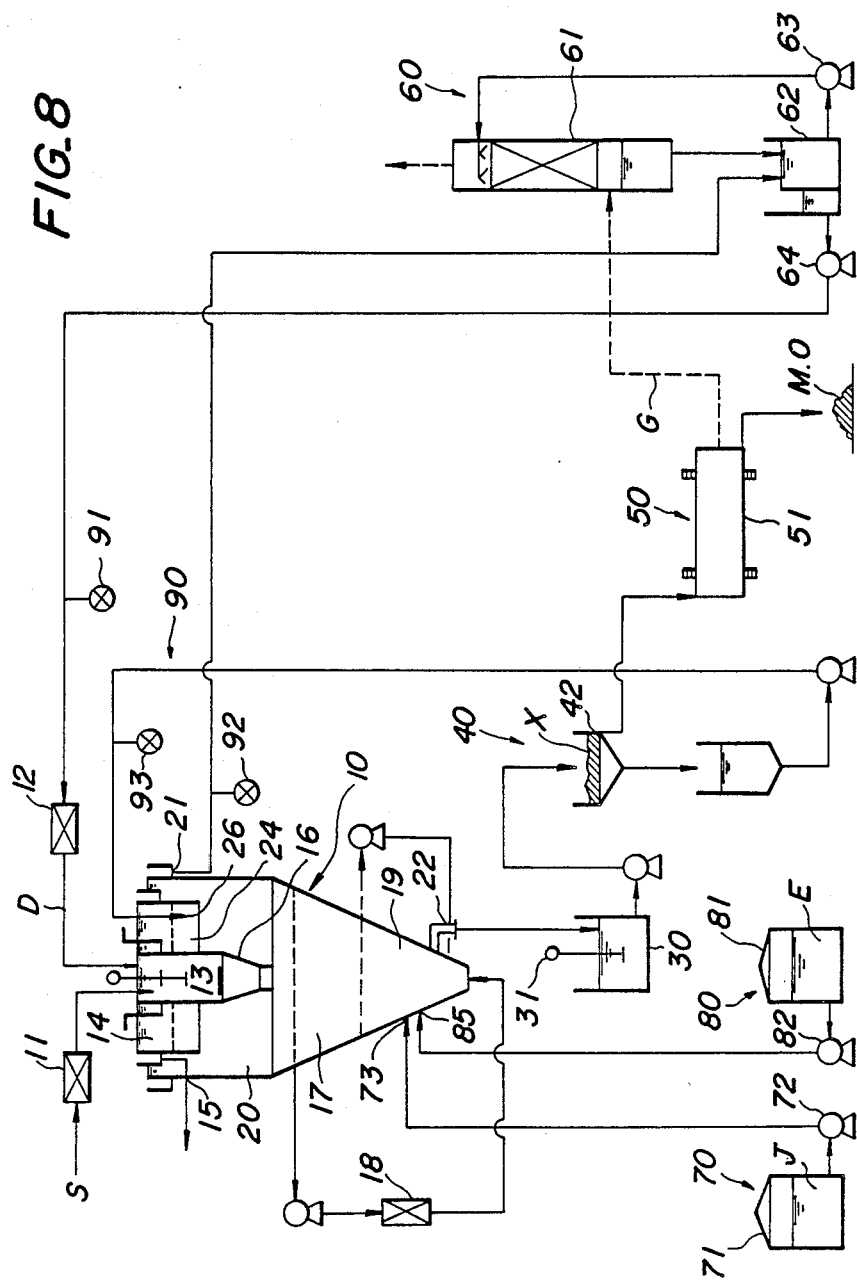
FIGS. 8 and 9 are schematic views of embodiments of the metal stripping system according to the invention, respectively.
Figure 9:
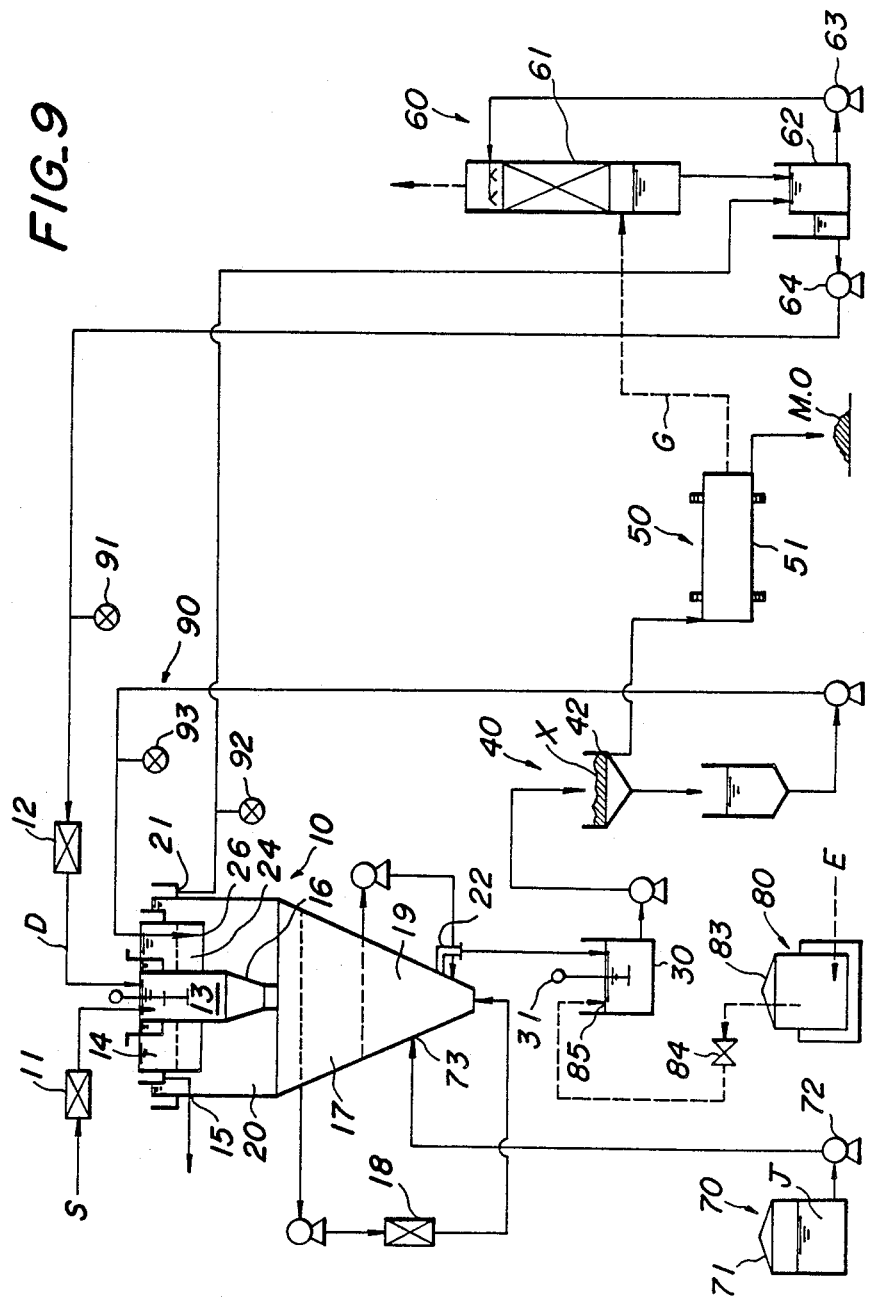

Then, the supply position of the chemicals for the concentration adjustment will be described with reference to the conventional metal stripping system as shown in FIG. 7 as well as the metal stripping systems according to the invention as shown in FIGS. 8 and 9.

It is preferable to add the aqueous $NH_4HF_2$ *solution J* (30–40%) to the lower portion of the crystallization apparatus 10. As shown in FIGS. 8 and 9, this supply position 73 corresponds to that region of the crystallization apparatus 10 which gradually grows the fluorinated metal complex crystal X. Therefore, the addition of the solution J at the position 73 causes the crystal growth by concentration gradient of the stripping solution D as well as temperature gradient thereof, whereby the crystal growth is accelerated. On the contrary, undesirable crystal deposition occurs at positions other than the position 73. In case of the system of FIG. 7, for example, the solution J is supplied to an absorbing liquid tank 62 in an absorbing device 60 of decomposition gas, but in this case the crystal X is deposited in the absorbing liquid tank 62 to cause the adhesion and clogging of the crystal X inside an absorbing liquid pump 63 and a decomposition gas absorbing tower 61 or pipes connecting therebetween. Moreover, a crystal receiving tank 30 is considered as the supply position of the solution J. However, a filtrate left from the crystal receiving tank 30 is supplied to a settling zone 24 for stripping solution located beneath the settling zone 14 for organic solvent in the crystallization apparatus 10, so that the effect by adding the solution J to the tank 30 is inferior as compared with the case of adding the solution J to the lower portion of the apparatus 10.

An ammonia E may be added as ammonia water or $NH_3$ gas, if necessary. Preferably, ammonia liquor recovered from the ammonia recovering step 6 of FIG. 1 can be used as ammonia water. It is desirable that the ammonia is supplied to the lower portion of the crystallization apparatus 10 as shown in FIG. 8 or the crystal receiving tank 30 as shown in FIG. 9. The reason why the ammonia E is supplied to the lower portion of the apparatus 10 is the same as in the case of adding the aqueous $NH_4HF_2$ solution J. On the other hand, when the ammonia E is supplied to the crystal receiving tank 30, HF in the stripping solution decreases by neutralization, while $NH_4HF_2$ increases by an amount corresponding to the decreased amount of HF, so that the crystal X is further deposited. Further, the filtrate after the liquid-solid separation is suitable as a stripping solution to be supplied to the settling zone 24 of the apparatus 10 because the HF concentration is decreased. If the ammonia E is supplied at positions other than the above two positions, undesirable crystal deposition still occurs. For instance, the $NH_3$ gas E is supplied to the decomposition gas absorbing tower 61 in the absorbing device 60 of decomposition gas in the conventional system of FIG. 7, but in this case the deposition, adhesion and clogging of the crystal X are unfavorably caused likewise the case of adding the aqueous $NH_4HF_2$ solution J to the absorbing liquid tank 62.

Further, it is suitable that the fluorine series decomposition gas G is absorbed into the stripping solution discharged from the outlet 21 of the crystallization apparatus 10 at the decomposition gas absorbing tower 61 and then supplied to the mixing chamber 13 of the apparatus 10. In any methods other than the above, undesirable crystal deposition still comes into problem. Even in the above preferable method, there is a fear of depositing the crystal X due to the increase of the $NH_4HF_2$ concentration in the discharged stripping solution, which is solved by maintaining the concentration and composition of the discharged stripping solution within certain controlling ranges.

According to Example 2 as mentioned later, the concentration condition of the stripping solution causing no deposition of $(NH_4)_3FeF_6$ crystal X at the outside of the crystallization apparatus under a cooling state is not less than 85 g/l as $NH_4HF_2$ and not more than 10 g/l as HF considering the case that the waste acid is nitric-hydrofluoric acid. These concentration conditions correspond to the temperature gradient of not more than about 0.15 g/l/° C. at the low temperature region (not more than 20 ° C.) of the solubility curve shown in FIGS. 3 to 6. For instance, when using the organic solvent consisting of 30 V/V % of di-(2-ethylhexyl) phosphoric acid (hereinafter abbreviated as D2EHPA) and 70 V/V % of n-paraffin, the extracted $Fe^{3+}$ concentration in the organic solvent is within a range of about 12–20 g/l. Furthermore, when the flow ratio of organic solvent S (organic phase) to stripping solution D (aqueous phase) in the supplying to the crystallization apparatus, which is hereinafter called as O/A, is varied within a range of ⅓ to ⅔, the decrease of $NH_4HF_2$ concentration in the stripping solution by back-extraction reaction is within a range of 12.2–40.7 g/l, so that the varying range of $NH_4HF_2$ concentration is about 30 g/l. Since the controlling range of $NH_4HF_2$ concentration in the stripping solution discharged from the crystallization apparatus is 85–115 g/l, it is sufficient to adjust the $NH_4HF_2$ concentration of the stripping solution contained in the crystallization apparatus within a range of 100±15 g/l. In order to obtain the $NH_4HF_2$ concentration of more than 115 g/l, the concentration to be supplied to the apparatus must be more than 130 g/l, which causes economical troubles in view of the maintenance on the concentration in the stripping solution.

Figure 10:
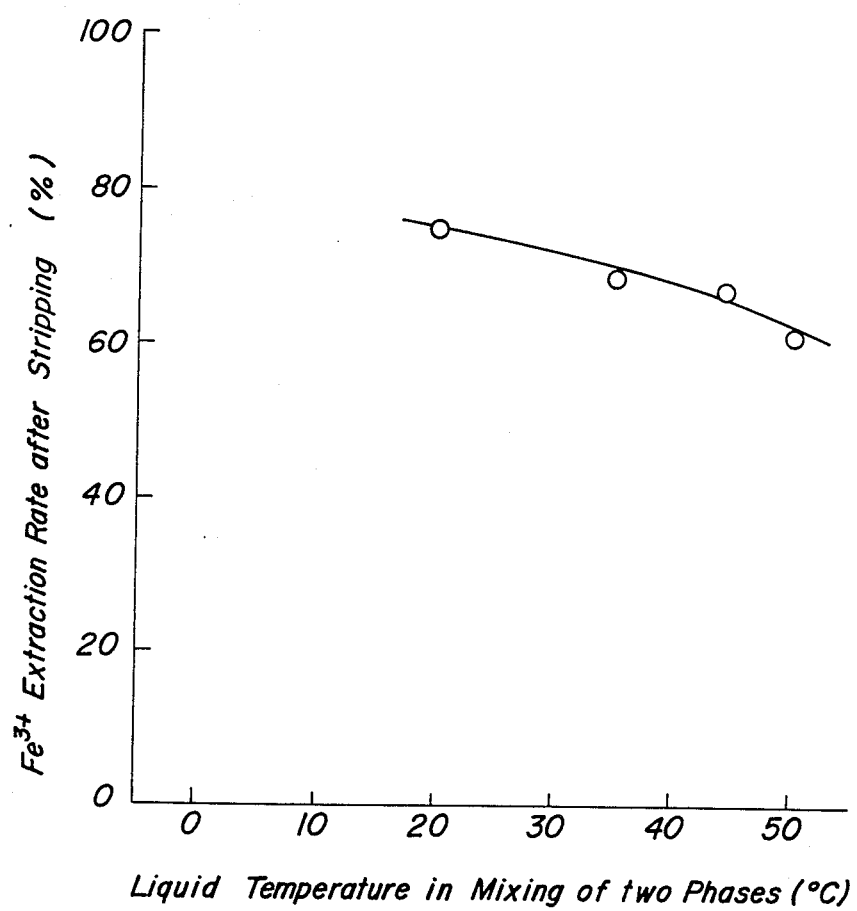
FIG. 10 is a graph showing the relation between the liquid temperature in the mixing of two phases and the $Fe^{3+}$ extraction rate in the organic solvent after the mixing.

FIG. 10 shows the relation between the liquid temperature in the mixing of two phases and the $Fe^{3+}$ extraction rate in the organic solvent as shown in the following Example 3. As apparent from FIG. 10, the $Fe^{3+}$ extraction rate after the mixing lowers as the liquid temperature in the mixing becomes higher, which shows a tendency of deteriorating the organic solvent. Assuming that practicable four-stage mixer-settlers are used for iron extraction and the $Fe^{3+}$ extraction is performed at the same extraction rate in every stage, if the $Fe^{3+}$ extraction rate at each stage is not less than 68%, the overall $Fe^{3+}$ extraction rate is more than 99%. In this connection, the liquid temperature corresponding to the $Fe^{3+}$ extraction rate of 68% is 40° C., so that it is desirable to adjust the liquid temperature in the mixing of two phases to not more than 40° C. Moreover, the temperature of the organic solvent to be supplied to the apparatus is adjusted for the adjustment of the liquid temperature in the mixing. The organic solvent temperature is desirable to be 20°–25° C. considering that it is adjusted within a range of 5°–40° C. higher by 5° C. than the atmospheric temperature (0°–35° C.), and the adjusting range in the warming or cooling is within 20° C. Therefore, the temperature of the stripping solution to be supplied to the apparatus in a flow ratio (O/A) of $\frac{1}{3}$–$\frac{2}{3}$ is within a range of 45°–53° C.

Furthermore, the temperature of the stripping solution in the cooling zone is desirable to be held within a range of 15°–20° C. considering that the temperature adjusting range is within 20° C. with respect to the atmospheric temperature (0°–35° C.). On the other hand, the back-extraction velocity and rate of $Fe^{3+}$ are high as the liquid temperature in the mixing chamber becomes high, so that the liquid temperature is maintained near 40° C. as mentioned above. Therefore, the temperature distribution in the crystallization apparatus is held substantially constant through the year and the composition and concentration of the stripping solution are adjusted as previously mentioned, so that the stable crystal deposition occurs according to the illustrated solubility curves and the continuous service of the apparatuse is easily performed for a long time of period.

Figure 11:
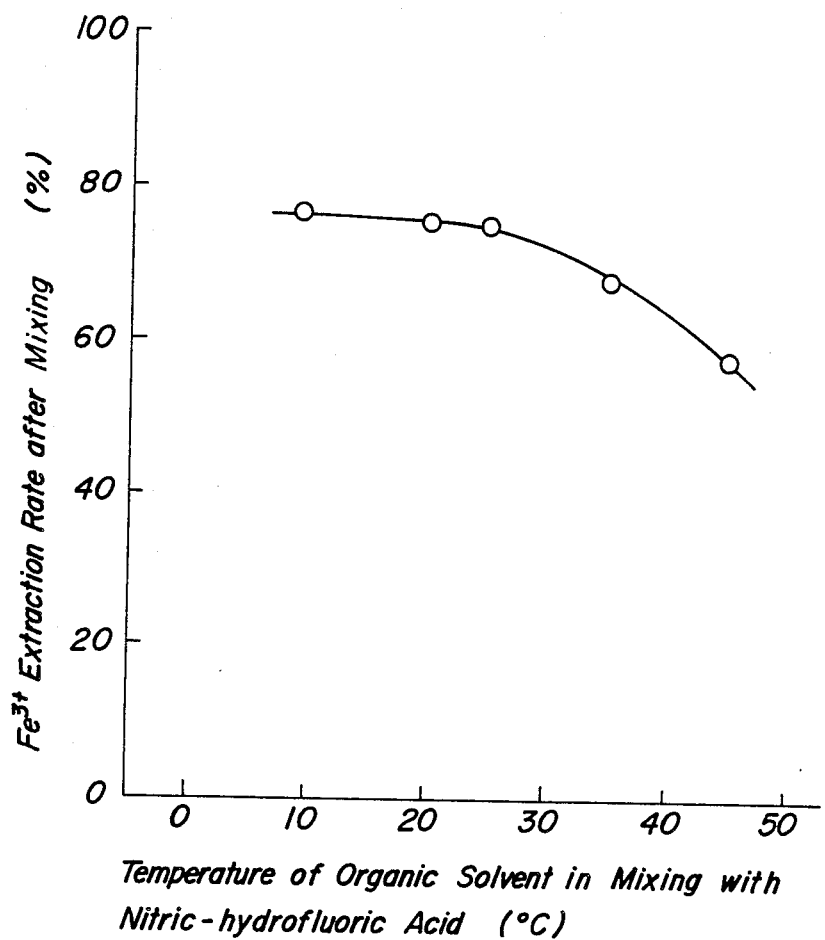
FIG. 11 is a graph showing the relation between the temperature of the organic solvent in the mixing and contacting with aqueous solution of nitric-hydrofluoric acid and the $Fe^{3+}$ extraction rate after the contacting.

FIG. 11 shows the relation between the temperature of organic solvent in the mixing with an aqueous solution of nitric-hydrofluoric acid and the $Fe^{3+}$ extraction rate in the organic solvent as shown in the following Example 4, from which it is apparent that when the organic solvent temperature is more than 35° C., the reduction of $Fe^{3+}$ extraction rate and hence the deterioration of the organic solvent becomes conspicuous. Therefore, it is desirable that the organic solvent temperature is not more than 30° C. at steps other than the metal stripping step.

Furthermore, Example 5 shows the results of $Fe^{3+}$ extraction from hydrochloric acid at low temperatures with the same organic solvent as in Examples 1 and 4. When the temperature is less than 10° C., the viscosity of the organic solvent containing extracted $Fe^{3+}$ becomes higher, and the third phase is formed in the settler part of a $Fe^{3+}$ extraction mixer-settler. Therefore, it is desirable that the organic solvent temperature is not less than 10° C., and the preferable temperature range is 10°–30° C. at steps other than the metal stripping step.

As mentioned above, the working temperature of the organic solvent repeatedly used in the metal stripping step by the solvent extraction method is generally within a range of 10°–30° C. considering the deterioration of organic solvent at high temperature side and the production of third phase at low temperature side, but it is particularly 25°–40° C. in the crystallization apparatus for metal stripping considering the back-extraction efficiency and crystallization conditions.

Preferably, when the temperature of the organic solvent supplied to the crystallization apparatus is maintained at 20°–25° C. considering the atmospheric temperature, the temperature condition inside this apparatus is substantially constant through the year, whereby the operation of the metal stripping step can stably be performed.

By setting the working temperature of the organic solvent for metal extraction at the above mentioned range, the deterioration of organic solvent due to the temperature rising can be prevented without damaging the object of metal stripping.

According to the invention, the aqueous $NH_4HF_2$ solution and ammonia are supplied to effective positions of a region ranging from the lower portion of the crystallization apparatus to the crystal receiving tank, which region takes no notice of the crystal deposition, while the fluorine series decomposition gas is absorbed into the discharged stripping solution having the controlled concentration and composition for circularly supplying to the mixing chamber of this apparatus, so that the operation of the metal stripping step can smoothly be continued as mentioned in the following examples.

Then, the invention will be described with respect to the metal stripping system.

In FIGS. 8 and 9 are shown the fundamental structures of the metal stripping system according to the invention, respectively. This system comprises a crystallization apparatus 10 for metal stripping, a tank 30 for receiving the crystal, a liquid-solid separation device 40, a crystal drying and decomposition device 50, an absorbing device 60 of decomposition gas, a device 70 for supplying an aqueous solution of $NH_4HF_2$, a device 80 for supplying ammonia, and a device 90 for measuring concentrations of stripping solutions.

As the crystallization apparatus 10 for metal stripping, use may be made of the apparatus disclosed in the previously mentioned Japanese Patent laid open No. 58-81,402, but it is preferable to use the crystallization apparatus for metal stripping of the inverted frustocone type provided at its lower portion with the forced circulation zone 19 for stripping solution as shown in FIG. 2, which corresponds to the apparatus filed at the same date as in the invention. As the liquid-solid separation apparatus 40, use may be made of a filter 42 shown in FIGS. 8 and 9 as well as a centrifugal separator. As the crystal drying and decomposition device 50, an assembly 51 of crystal drying kiln and crystal decomposition kiln and various furnaces can be adopted.

The decomposition gas absorbing device 60 comprises a decomposition gas absorbing tower 61, an absorbing liquid tank 62, an absorbing liquid pump 63, a stripping solution supply pump 64 and the like. This device 60 is connected to the stripping solution outlet 21 and an outlet 26 inside the mixing chamber 13 in the crystallization apparatus 10 through pipes and also the fluorine series decomposition gas G left from the crystal drying and decomposition kiln 51 is introduced into the devive 60. The supply device 70 for aqueous $NH_4HF_2$ solution J comprises a tank 71, a pump 72, an outlet 73 and the like, wherein the outlet 73 is located at the lower portion of the crystallization apparatus 10 as shown in FIGS. 8 and 9. The ammonia supply device 80 may be disposed according to the need, and comprises an ammonia water tank 81, a pump 82 and an outlet 85 as shown in FIG. 8 or an $NH_3$ gas holder 83, an $NH_3$ gas valve 84 and an outlet 85 as shown in FIG. 9. In this case, the outlet 85 is opened to the lower portion of the crystallization apparatus 10 or the crystal receiving tank 30. Since the deposition of the crystal X newly occurs near the outlet 73 for the aqueous $NH_4HF_2$ solution and the outlet 85 for ammonia, it is desirable that the stripping solution D is in a fluidized state at such areas. For this purpose, the forced circulation zone 19 is disposed in the lower portion of the crystallization apparatus 10 as previously mentioned, or a stirrer 31 is arranged in the crystal receiving tank 30.

The systems of FIGS. 8 and 9 are preferable embodiments of the invention and are not intended as limitations thereof.

It is to be noted that, in the above description of the structures of the conventional metal stripping system and the metal stripping system according to the present invention (as shown in FIGS. 7-9), numerous apparatus elements numbered and illustrated in FIGS. 7-9 are not specifically described under the discussions of FIGS. 7-9. It is to be understood that like-numbered elements of FIGS. 7-9 are identical and, therefore, are not discussed for each of the Figures.

Next, the invention will be described with respect to the control on the concentration in the fluoride series stripping solution.

As previously mentioned, the fluoride series stripping solution D for separating the fluorinated metal complex crystal X from the organic solvent S containing the extracted metal ions by the contacting at the metal stripping step 2 is usually an aqueous solution of $NH_4HF_2$ and HF. Since the composition of $NH_4HF_2$ is the same as $NH_4F+HF$, it is effective to control the concentration and composition of the stripping solution D in two terms of total HF (hereinafter abbreviated as T.HF) and total $NH_4F$ (hereinafter abbreviated as T.$NH_4F$). When molar concentrations (mol/l) of $NH_4HF_2$ and HF in the stripping solution D are a and b, respectively, there are established the following relationships:

$$T.HF = a + b \quad (12)$$

$$T.NH_4F = a \quad (13)$$

The measurement of T.HF and T.$NH_4F$ can be performed by a neutralization titration method using a potentiometric titration meter or by a combination of conductivity measurement using an electromagnetic conductivity meter with an analysis of total fluorine (hereinafter abbreviated as T.F) using an ion electrode process as mentioned below.

In FIGS. 12 to 14 are shown neutralization titration curves (differential type) of the stripping solution D (1 ml) with an aqueous solution of N/2 NaOH as measured by the potentiometric titration meter, respectively, wherein FIG. 12 is the case of stripping solution having a ($NH_4HF_2$ concentration) = 1.75 mol/l = 100 g/l and b (HF concentration) = 0 mol/l = 0 g/l, FIG. 13 is the case of stripping solution having a = 1.75 mol/l = 100 g/l and b = 0.50 mol/l = 10 g/l, and FIG. 14 is the case of stripping solution having a = 1.75 mol/l = 100 g/l and b = 1.00 mol/l = 20 g/l. As seen from FIGS. 12 to 14, two main peaks appear in each titration curve. When both the concentrations are calculated by assigning a region from the beginning of titration (0 ml) to a first peak and a region from the first peak to a second peak to T.HF and T.$NH_4F$, respectively, the calculated values are well coincident with the T.HF and T.$NH_4F$ are measured from measured from a and b values in the equations (12) and (13). Therefore, the values of T.HF and T.$NH_4F$ are measured from the neutralization titration curve, from which the values of a and b can be known by the following equations:

$$a = T.NH_4F \quad (14)$$

$$b = T.HF - T.NH_4F \quad (15)$$

Figure 15:
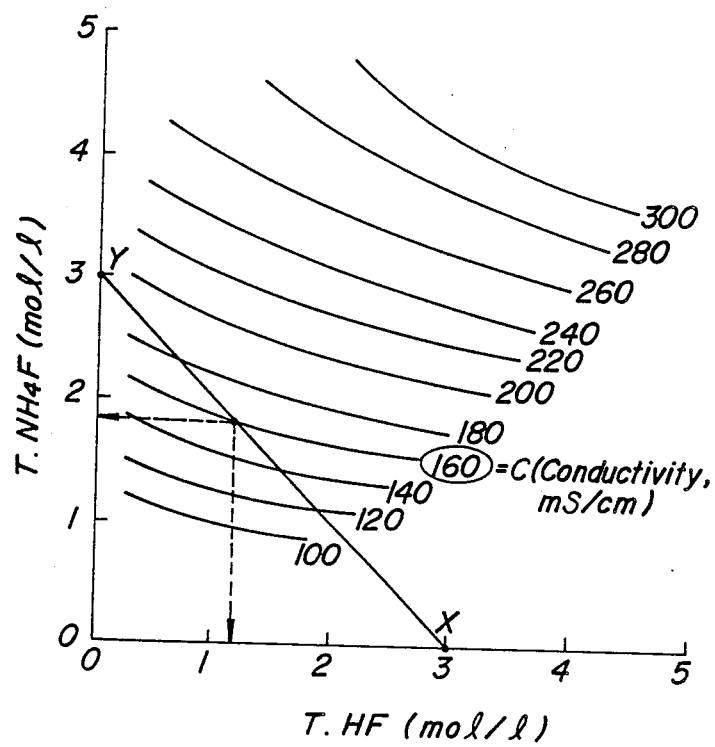
FIG. 15 is an equiconductivity curve of the fluoride series stripping solution at 25° C. as measured by an electromagnetic conductivity meter.

FIG. 15 shows equiconductivity curves based on values of the electric conductivity C in the stripping solution D having various values of a and b at 25° C. as measured by the electromagnetic conductivity meter, wherein an abscissa is the T.HF value and an ordinate is the T.$NH_4F$ value. The equiconductivity curve is slightly downward to the right. When the electric conductivity C is measured by the electromagnetic conductivity meter and the value of T.F is analyzed, for example, by an ion electrode process, the T.HF and T.$NH_4F$ values of the stripping solution D can be measured as follows. For instance, when C = 160 mS/cm and T.F = 3.00 mol/l, if normal lines are drawn from an intersection of the curve of C = 160 mS/cm with the line segment XY of T.F = 3.00 mol/l to the abscissa and ordinate in FIG. 15, the values at intersections to the coordinates correspond to T.HF and T.$NH_4F$ values of the stripping solution D.

Strictly speaking, a fluorinated metal ammonium complex is dissolved in the stripping solution D. For example, when the metal ion is $Fe^{3+}$, the stripping solution D is a solution of $NH_4HF_2$—HF—$(NH_4)_3FeF_6$. In general, however, the fluorinated metal ammonium complex is relatively small in the solubility to the stripping solution D, so that the dissolved amount of the fluorinated metal ammonium complex hardly influences on the analysis and the measurement. Therefore, the stripping solution D can be considered as $NH_4HF_2$-HF solution in order to determine the T.HF and T.$NH_4F$ values.

As mentioned above, the concentration and composition of the fluoride series stripping solution can be controlled by measuring the values of T.HF and T.$NH_4F$ according to anyone of the aforementioned two methods. The neutralization titration method can directly measure the values of T.HF and T.$NH_4F$, so that it is very convenient but its measurement is intermittent. On the other hand, the combination of conductivity measurement and total fluorine analysis can continuously control the concentration and composition of the stripping solution because the conductivity measurement is continuous even if the total fluorine analysis is performed intermittently.

In the system according to the invention as shown in FIGS. 8 and 9, the measuring position for the concentration and composition of the stripping solution D locates in three portions, i.e. a measuring portion 91 for the supplied stripping solution, a measuring portion 92 for the discharged stripping solution and a measuring portion 93 for the filtrate after the separation of crystal. At these measuring portions, the concentration and composition of the stripping solution are properly determined within the controlling ranges while measuring the T.HF and T.NH$_4$F values, whereby the chemicals may be supplied to the crystallization apparatus.

As previously mentioned in detail, the concentration of the fluoride series stripping solution is controlled at two terms of T.HF and T.NH$_4$F to supply chemicals and the like at proper positions to the crystallization apparatus, whereby the stable operation of the metal stripping system can be realized over a long period with preventing the occurrence of troubles such as the clogging of the pipe accompanied with the supply of chemicals, and the like.

The following examples are given in illustration of the invention and are not intended as limitations thereof.

Comparative Example

With the conventional metal stripping system shown in FIG. 7, the separation of Fe$^{3+}$ extracted in the organic solvent consisting of 30 V/V % of D2EHPA and 70 V/V % of n-paraffin was carried out at a rate of 45 tons/month as a crystal of (NH$_4$)$_3$FeF$_6$. In the crystallization apparatus 10 for metal stripping, the liquid temperature inside the mixing chamber 13 was adjusted to 30°–40° C., and the liquid temperature inside the cooling zone 17 was adjusted to 15°–20° C. Then, in order to adjust the concentration and composition of the stripping solution to 85–115 g/l of NH$_4$HF$_2$ and 0–10 g/l of HF at the measuring portion 92, the 30% aqueous solution of NH$_4$HF$_2$ was added from the outlet 73 to the absorbing liquid tank 62. In 24 hours after the beginning of the addition, the (NH$_4$)$_3$FeF$_6$ crystal deposited in the absorbing liquid tank 62 adhered to the insides of the pump 63 and the decomposition gas absorbing tower 61 to cause the clogging thereof, resulting in the stop of the operation. Further, when the NH$_3$ gas E was added to the decomposition gas absorbing tower 61 apart from the NH$_4$HF$_2$ solution J, the clogging with the (NH$_4$)$_3$FeF$_6$ crystal was still caused inside the pump 63 and the tower 61.

Example 1

With the system according to the invention shown in FIG. 9, the iron separation was carried out under substantially the same conditions as in Comparative Example. In order to maintain the concentration and composition of the stripping solution D at the measuring portion 92 within the same range as in Comparative Example, the 30% aqueous solution of NH$_4$HF$_2$ was adequately supplied to the forced circulation zone 19 of the crystallization apparatus 10. Even after 30 days of the operation, there was observed no deposition and clogging of (NH$_4$)$_3$FeF$_6$ crystal due to the addition of such NH$_4$HF$_2$ solution J.

Apart from the NH$_4$HF$_2$ solution J, ammonia E was properly added to the lower portion of the crystallization apparatus 10 as ammonia water (FIG. 8) or to the crystal receiving tank 30 as NH$_3$ gas (FIG. 9). Even in this case, the deposition and clogging of (NH$_4$)$_3$FeF$_6$ crystal due to the addition of ammonia E were not observed after 30 days of the operation.

Example 2

The separation of Fe$^{3+}$ from nitric-hydrofluoric acid waste liquid was carried out in the crystallization apparatus 10 for metal stripping having (NH$_4$)$_3$FeF$_6$ crystal production capability of 45 tons/month as shown in FIG. 2. In this case, the organic solvent S consisting of 30 V/V % of D2EHPA and 70 V/V % of n-paraffin and containing 14.9–19.5 g/l of the extracted Fe$^{3+}$ was charged into the mixing chamber 13 at a rate of 2 m$^3$/hr, while the stripping solution D containing 65–131 g/l of NH$_4$HF$_2$ and 0–20 g/l of HF was charged into the mixing chamber 13 at a rate of 3.5 m$^3$/hr (O/A=1/1.75). The temperature of the organic solvent was adjusted to 20°–23° C., and the temperature of the stripping solution was adjusted to 45°–50° C. And also, the temperature of the stripping solution in the cooling zone 17 was adjusted to 15°–20° C. As the concentration and composition of the stripping solution discharged from the apparatus 10, NH$_4$HF$_2$ was 54–126 g/l and HF was 0–25 g/l. The depositing state of the crystal inside pipes connected to the cooling zone is shown in the following table.

| Run No. | Concentration of stripping solution discharged NH$_4$HF$_2$ (g/l) | HF (g/l) | Deposition of crystal inside pipes |
|---|---|---|---|
| 1 | 54 | 3 | presence |
| 2 | 90 | 0 | none |
| 3 | 104 | 8 | nearly none |
| 4 | 115 | 12 | presence |
| 5 | 85 | 21 | fairly presence |
| 6 | 104 | 25 | fairly presence |
| 7 | 94 | 13 | presence |
| 8 | 82 | 15 | presence |
| 9 | 87 | 8 | nearly none |
| 10 | 80 | 7 | presence |
| 11 | 110 | 3 | none |
| 12 | 126 | 0 | none |

As apparent from the above table, there is hardly caused the deposition of the crystal inside the pipes when NH$_4$HF$_2$ is not less than 85 g/l and HF is not more than 10 g/l.

Example 3

The same organic solvent S as used in Example 1 (about 20° C.) was mixed and contacted with the stripping solution D containing 125 g/l of NH$_4$HF$_2$ (20°–50° C.) at a rate (O/A) of ⅓ by a batch process for 1 hour. Then, the extractant in the organic solvent was treated with an aqueous solution of HCl to convert NH$_4$$^+$ form into H$^+$ form. Subsequently, the organic solvent containing H$^+$ form extractant was contacted with nitric-hydrofluoric acid waste liquid containing 32.2 g/l of Fe$^{3+}$ and 45 g/l of HF at a rate (O/A) of 1.5 to measure Fe$^{3+}$ extraction rate. As seen from the results of FIG. 10, the Fe$^{3+}$ extraction rate lowered as the temperature of the stripping solution rised.

Example 4

After the organic solvent having the same composition as in Example 1 and containing no metal ion was mixed and contacted with an aqueous solution of nitric-hydrofluoric acid (180 g/l NHO$_3$+40 g/l HF) at 20°–45° C. and a rate (O/A) of 1.5 by a batch process for 24 hours, it was contacted with the same nitric-hydrofluoric acid waste liquid as in Example 1 at a rate (O/A) of 1.5 to measure Fe$^{3+}$ extraction rate. As seen from the results of FIG. 11, the Fe$^{3+}$ extraction rate lowered considerably as the temperature of the organic solvent in the mixing became higher.

Example 5

The same organic solvent as in Example 4 and hydrochloric acid waste liquid containing completely oxidized $Fe^{2+}$ ($Fe^{3+}$=90.5 g/l, HCl=64.8 g/l) were charged into a one-stage mixer-settler having a size of 100 mm×100 mm×200 mm (height) at flow rates of 5 l/hr and 1 l/hr, respectively and mixed by means of a stirrer with a revolution number of 800 rpm to perform $Fe^{3+}$ extraction. This procedure was repeated three times by adjusting the liquid temperature in the mixing to 6.5° C., 10.8° C. and 14.3° C. on average, respectively. As a result, the formation of the third phase in the settler part was observed at the liquid temperature of 6.5° C. but was hardly observed at the liquid temperature of 10.8° C. and 14.3° C.

What is claimed is:

1. A process for operating a system provided with a crystallization apparatus comprising a mixing zone, a settling zone for organic solvent, a settling zone for fluoride series stripping solution, a separation zone of fluorinated metal complex crystal and a stripping solution cooling zone, wherein contacting an organic solvent containing extracted metal ions with a fluoride series stripping solution in the mixing zone to deposit a fluorinated metal complex crystal, the temperature of said organic solvent being kept at 20°-25° C., and liquid temperature in the mixing of said organic solvent and stripping solution being kept at not more than 40° C., and then recovering the resulting crystal as a metal or a metal oxide, characterized in extracting iron ions from the organic solvent, supplying an aqueous solution of $NH_4HF_2$ to the stripping solution cooling zone in the apparatus, said stripping solution supplied to the apparatus having a concentration so adjusted that the concentration of said stripping solution discharged from the apparatus is 85-115 g/l as $NH_4HF_2$ and not more than 10 g/l as HF and the temperature of said stripping solution in said cooling zone being kept at 15°-20° C., and absorbing the stripping solution discharged from an outlet for stripping solution with a decomposition gas of the fluorinated metal complex crystal and supplying it to the mixing zone, and after the separation of the crystal, supplying a filtrate to the settling zone for stripping solution located beneath the settling zone for organic solvent, whereby the fluoride series stripping solution is circularly used in the system.

2. The process according to claim 1, wherein the temperature of said organic solvent is adjusted to be 25°-40° C. in said crystallization apparatus and 10°-30° C. in pipes and tank other than said apparatus.

* * * * *